United States Patent [19]
Gorski

[11] 3,877,535
[45] Apr. 15, 1975

[54] FLEXIBLE FRAME SNOWMOBILE
[76] Inventor: Raymond W. Gorski, 10355 Main St., Findley Lake, N.Y.
[22] Filed: Aug. 31, 1973
[21] Appl. No.: 393,313

[52] U.S. Cl. ................................ 180/5 R; 180/9.46
[51] Int. Cl. ............................................ B62m 27/00
[58] Field of Search ............. 180/3, 4, 5 R, 6, 9.44, 180/9.46, 9.2 R

[56] References Cited
UNITED STATES PATENTS
2,378,111  6/1945  Tucker et al. .................... 180/5 R
2,419,522  4/1947  Acton .............................. 180/5 R
2,617,659  11/1952 Grenier ......................... 180/5 R X
3,016,965  1/1962  Paul ................................ 180/5 R
3,664,446  5/1972  Burtis ............................. 180/5 R Primary Examiner—Robert S. Ward, Jr.
Assistant Examiner—John J. Love

[57] ABSTRACT

The present invention relates to endless track traction vehicles and, more particularly, to an endless track snowmobile with hinged frame and shock absorbing member. The skis which form a part of the steering mechanism are articulated to the front of the vehicle.

6 Claims, 3 Drawing Figures 3,877,535

FLEXIBLE FRAME SNOWMOBILE

REFERENCE TO PRIOR ART

This invention constitutes an improvement over U.S. Pat. No. 2,617,659 which issued Nov. 11, 1952 to J. W. Grenier, which shows a snowmobile with a two-part body joined by a bendable means.

STATEMENT OF INVENTION

This invention relates to snowmobiles and, more particularly, to a snowmobile frame with a two-part body joined at a pivot point and also joined by a shock absorber.

OBJECTS OF THE INVENTION

An object of this invention is to improve the rider's comfort and the steering ability of the snowmobile.

Another object is to provide a snowmobile that is simple in construction, economical to manufacture and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
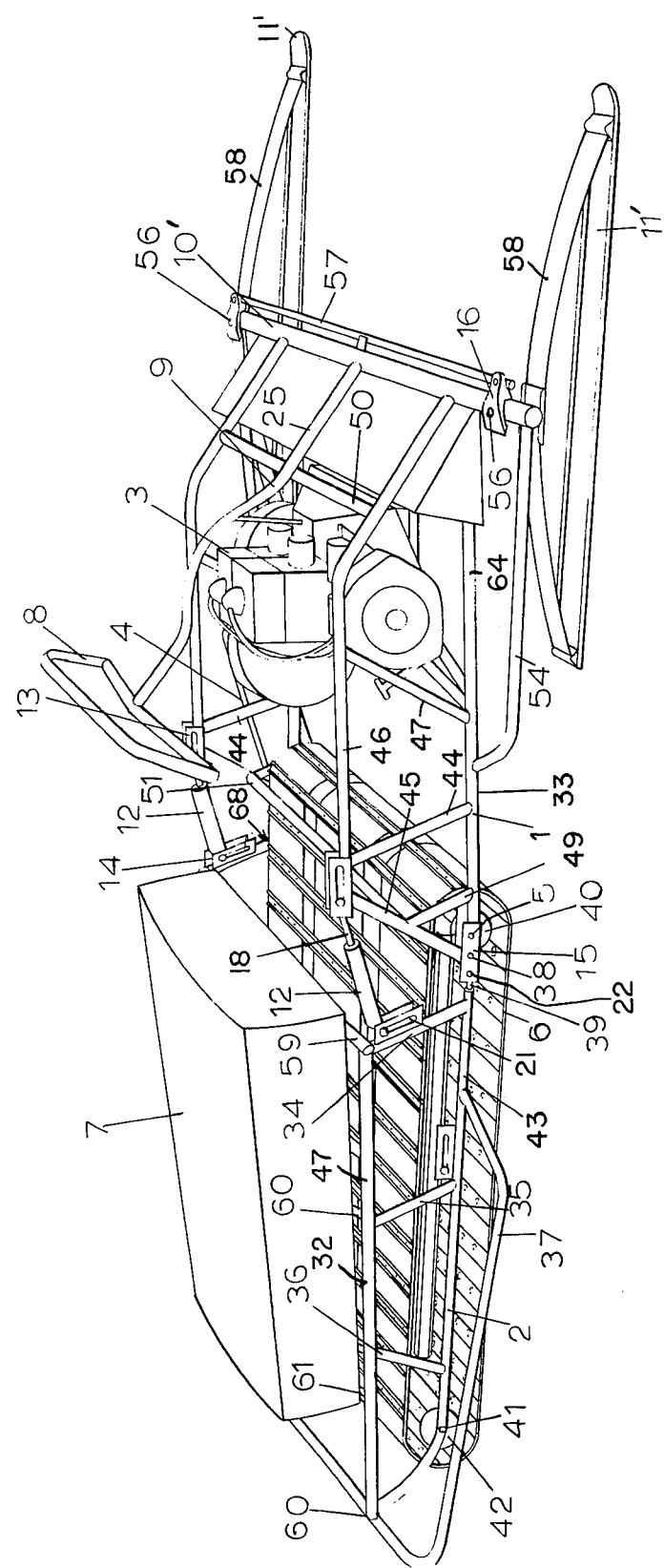
FIG. 1 is a perspective view of a snowmobile showing an application of the invention.
Figure 2:
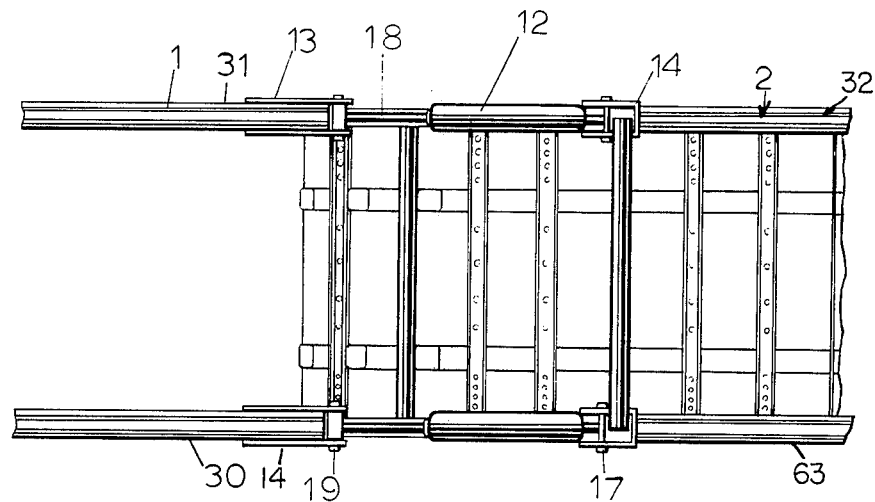
FIG. 2 is a partial top view of the central portion of the snowmobile showing attachment of the shock absorbing members.
Figure 3:
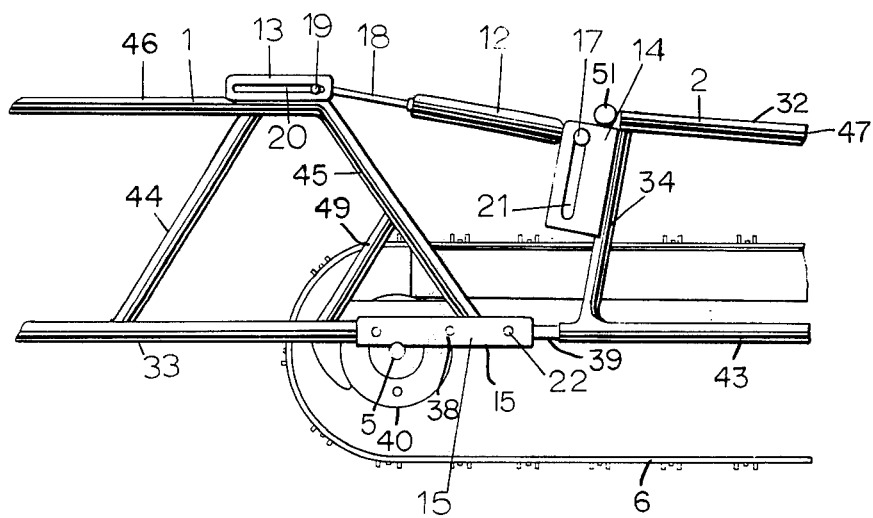
FIG. 3 is a partial side view of FIG. 2.

The snowmobile is generally made up of two units. The front unit 1 carries the engine, steering gear and the runners. The rear unit 2 carries the seat 7 and the tracks 6. The front unit 1 is made up of the two laterally spaced trusses 33 and 44 which are held in spaced relation to each other by the laterally extending members 50 and 51. Each truss 33 and 44 is made up of a top longitudinally extending member 46 and a bottom longitudinally extending member 64. The longitudinal members 64 and 46 are held in vertically spaced relation to each other by the strut members 44, 45 and 47. The strut 49 reinforces the members 33 and 45 and is attached at its upper end to member 45 and at its lower end to the member 33. The top members 46 curve downwardly at their front end and are attached to the laterally extending member 10' as are the bottom members 33. The runners 11 are fixed to the king bolts 56 which extend through member 10'. The king bolts 56 are fixed to the crank members 16. The crank members 16 are pivoted to the tie rod 57 which is in turn controlled by the steering rod 25 attached to the steering wheel 8. The engine 3 is supported on suitable frame means and roll bars 54 are fixed at their rear end to the members 33 and extend forward and outward and are attached at their front end to the outer ends of the member 10'. The spaced brackets 13 are fixed to the member 46 and slots 20 are formed in the spaced brackets. The slots 20 slidably receive the pins 19. The pins 19 are fixed to the front end of the piston rods 18.

The brackets 15 are fixed to the lower longitudinally extending members 64 and front axle 5 is received in the brackets 15.

The rear assembly is made up of two spaced trusses 32 and 63. Trusses 32 and 63 are held together in spaced relation to each other by transversely extending members 59, 60 and 61. Trusses 32 and 63 are made up of the lower longitudinally extending members 43 and the upper longitudinally extending members 47. The struts 34, 35 and 36 hold the longitudinally extending members 43 and 47 in spaced relation to each other. The front end of the bottom member 43 has the extension 39 fixed to it and extension 39 is pivoted to the brackets 15 at 22.

Front axle 5 is received in the brackets 15. Front axle 5 rotatably receives the front roller 40 and rear axle 41 is fixed to the rear end of the bottom longitudinally extending member 43 and rear roller 42 is rotatably supported on rear axle 41. The endless track 6 is supported on rollers 40 and 41. Roller 40 is driven by belt 4 from engine 3. The brackets 14 are fixed to the strut 34 and slots 21 in brackets 14 slidably receive the pin 17 which is fixed to the cylinders 12. The roll bar 37 is fixed at its front end to the bottom member 43 and extends outwardly and rearwardly then transversely across the rear end of the snowmobile and is fixed at 60 to the rear end of the member 32 and to the upwardly and rearwardly extending end of the bottom member 43.

The seat 7 is supported on the transversely extending members 59, 60 and 61.

It will, therefore, be seen that the front unit can swing up and down relative to the rear member about the pivot 22. This swinging of the members 1 and 2 relative to each other is restrained by the shock absorber members 11 having cylinders 12. Steering is carried out by steering wheel 8 fixed to steering post 9 which is connected to the tie rod 57 in a conventional manner. The tie rod 57 is connected to the knuckle joints 16 which are in turn fixed to the upper end of the king bolts 56. The lower end of the king bolts 56 are fixed to the springs 58 which have their ends fixed to the skis 11'.

When the snowmobile is running over rough terrain, as where it approaches the brow of a hill, the runners may pass over the brow of the hill and maintain contact with the ground extending the piston rod 57 in cylinder 58 of the shock absorber members 12. A snubbing action will, however, be accomplished by the shock absorbers 12 which are of the type used in automotive shock absorbers and are familiar to those skilled in the art. The seat 7, as shown, is supported on the transverse frame members 59, 60 and 61.

The foregoing specification sets forth the invention in its preferred practical forms but the structure is capable of modification within a range of equivalents without departing from the invention which is to be understood is broadly novel as is commensurate with the appended claims.

The embodiments of the invention in which an exclusive property or privilege is claimed are defined as follows:

1. A snowmobile comprising
a front frame,
a rear frame swingably connected to said front frame,
runners supported on spaced king bolts on the front of said front frame,
a tie rod, means connecting said tie rod to said king bolts,
a steering column,
means connecting said steering column to said tie rod,
first brackets having first slots fixed to said rear frame spaced from said pivotal connection,
and second brackets having second slots fixed to said front frame and spaced from said swingable connection,
a shock absorber member having a cylinder and a piston rod,
a pin attached to said cylinder and received in said first slot,
a pin attached to said piston rod and slidably received in said second slot whereby said front frame and said rear frame are swingable relative to each other,
a front axle on said front frame,
a rear axle on said rear frame,
a drive track supported on said axles,
an engine on said front frame,
and means drivably connecting said engine to said engine.

2. The snowmobile recited in claim 1 wherein said rear frame comprises two trusses spaced from each other and rigidly attached to each other by laterally extending members,
a seat supported on said laterally extending members,
and said axles being supported on said spaced trusses.

3. The snowmobile recited in claim 2 wherein said front frame comprises two laterally spaced trusses,
lateral members holding said trusses in rigid relation to each other,
said front trusses each being swingably connected to a said rear truss.

4. A snowmobile comprising
a front frame and a rear frame,
a track and a motor,
said front frame comprising two laterally spaced trusses, each having a top member, a bottom member, means holding said top member and said bottom member in fixed spaced relation to each other,
and means holding said front frame trusses in fixed spaced relation to each other,
said rear frame comprising two spaced trusses, each said rear frame truss having a top member and a bottom member, and means holding said top member and said bottom member of said rear frame in fixed relation to each other,
and means holding said trusses of said rear frame in fixed spaced relation to each other,
means swingably connecting said front end of said bottom frame member of said rear truss to the rear end of said bottom frame member of said front frame trusses,
a rear axle fixed to said rear frame trusses and extending therebetween,
a front axle supported on the rear end of said front frame trusses,
a front roller supported on said front axle,
a rear roller supported on said rear axle,
said motor being supported on said front frame,
and driving means connecting said motor to said front roller,
hydraulic shock absorber means supported on the top of said front frame,
means connecting said shock absorber means to said rear frame,
piston means on said hydraulic shock absorbers engaging the top of said front frame trusses,
skis,
means supporting said skis on said front frame,
and steering means for said skis.

5. The snowmobile recited in claim 4 wherein a roll bar is fixed at its front end to said bottom members of said rear frame trusses,
said roll bar extending outward and spaced laterally from the sides of said rear frame trusses,
said roll bar being fixed to the rear end of said top members of said rear frame trusses.

6. The snowmobile recited in claim 5 wherein a front ski axle is fixed to said front end of said bottom members of said front trusses,
front roll bar means attached to outer end of said front ski axle,
and means supporting said skis on said outer ends of said front ski axle,
said steering means being supported on said front ski axle,
and king bolts extending through the ends of said front ski axle,
said skis being supported on the ends of said king bolts,
a tie rod connecting to said skis and said steering means being connected to said tie rod.

* * * * *